Figure 1:
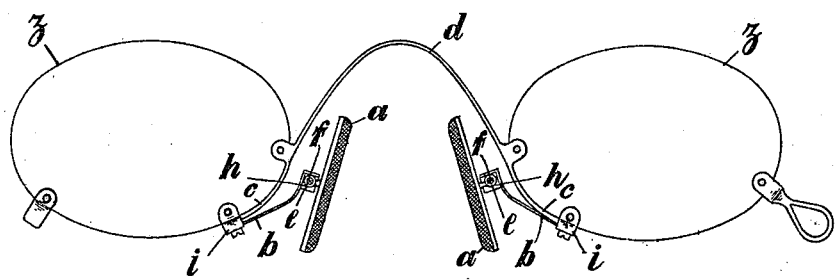

(No Model.) 2 Sheets—Sheet 1.

J. J. WOOD.
EYEGLASSES.

No. 470,029. Patented Mar. 1, 1892.

Witnesses.
J. A. Rutherford.
Robert Everett.

Inventor.
John J. Wood
By James L. Norris.
Attorney.

(No Model.) 2 Sheets—Sheet 2.

J. J. WOOD.
EYEGLASSES.

No. 470,029. Patented Mar. 1, 1892.

Witnesses: Inventor:
J. A. Rutherford. John J. Wood
Robert Everett. By James L. Norris.
Attorney.

UNITED STATES PATENT OFFICE.

JOHN JAMES WOOD, OF LIVERPOOL, ENGLAND.

EYEGLASSES.

SPECIFICATION forming part of Letters Patent No. 470,029, dated March 1, 1892.

Application filed August 12, 1891. Serial No. 402,466. (No model.) Patented in England March 19, 1890, No. 4,280.

*To all whom it may concern:*

Be it known that I, JOHN JAMES WOOD, a subject of the Queen of Great Britain and Ireland, residing at Liverpool, England, have invented new and useful Improvements in Eyeglasses, (for which I have obtained a patent in Great Britain, No. 4,280, dated March 19, 1890,) of which the following is a specification.

This invention has reference to pince-nez double eyeglasses or spectacles; and the chief object, among others, of my invention is to produce glasses which shall be best for the eyesight and at the same time shall be easy-fitting and comfortable to users. There are practically two kinds of pince-nez double eyeglasses or spectacles—namely, those which have a bridge so connecting the two glasses that the relative positions of the centers of the two glasses are constant and provided with means of different kinds for gripping the nose of the wearer and those having a spring or adjustable bridge wherein the relative positions of the centers of the glasses are variable and change according to the shape and size of the user's nose and which spring causes the pince-nez or spectacles to grip the nose, with or without additional or secondary gripping devices. Of these the kind I employ is that in which the relative positions of the centers of the two glasses are constant when applied to the nose of the wearer, (this type being best for the eyesight,) and, in connection with the frame of the glasses or to a suitable part thereof I fix a gripping device consisting of spring-retained hinged or movable gripping-bearers, the hinge or movable support being susceptible of movement laterally and the gripping-bearers being adapted to have oscillatory movement about the point of their spring-retained support. The supporting or retaining spring or springs may be attached to the glass-frames or the bridge-bar and may be of any suitable kind.

In the drawings which serve to illustrate my invention I show as an example a pince-nez of the kind in which the part connecting the two glasses together is a fixed or constant one.

Figure 2:
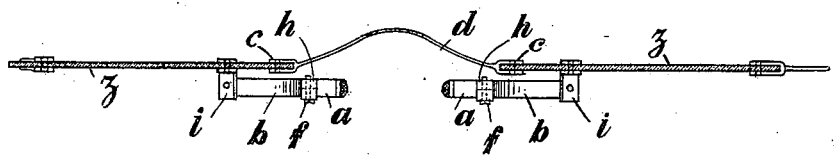
Figure 3:
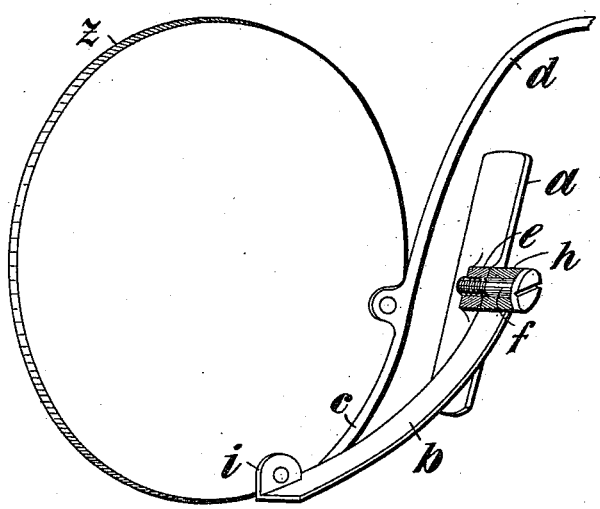

In the drawings, Figure 1 is an elevation. Fig. 2 is a plan, and Fig. 3 is a detail perspective view on an enlarged scale to more clearly illustrate the connection of the parts.

With reference to the figures, $a$ designates the gripping-bearers, and $b$ are the spring-supports.

$c$ is the frame for holding the glasses. $d$ is the bridge-piece connecting said frames together, and $z$ are the glasses.

The gripping-bearers $a$ consist of cork, rubber, or other faced bars, or other bars having an eye or hinge $e$ at their back, such eye or hinge being supported from the springs $b$ by a pin $f$, mounted in the support $h$, provided on the ends of the springs $b$. The spring-supports, it will be seen, project inward of the glass-frame. In the example shown, this relation is effected by the projecting block or piece $i$, by which the springs $b$ are supported by and from the frame $c$. The effect of this arrangement is that the path of the motion of the device is out of the plane of the glasses and is consequently free, and, moreover, the gripping-bearers hold the glasses a convenient distance from the eyes. In this example of pince-nez, it will be seen, the centers of the two glasses are always constant, whatever the shape and size of the user's nose may be, and yet may be used by persons having different sizes and shapes of noses and applied to different parts of a person's nose, and in any case the gripping-bearers $a$ will adapt themselves to the shape of the wearer's nose and will be comfortable to him.

According to a modification of this invention I make one of the bearers $a$ a fixture on the end of its spring-support $b$. I do this for the object of rendering the glasses firm upon the nose when applied—that is to say, so that they will not wriggle, but will remain in the position in which they are placed on the nose, and that position will be the correct one. The bearer $a$ to be fixed should be so fixed upon or after having the glasses fitted to the nose of the wearer. Having so arrived exactly at the angle or inclination at which the bearer stands in the best or required position of the eyeglasses or spectacles when applied to the nose, it (the bearer) is screwed up tight or otherwise fixed in that position. The glasses when applied will then always come to the desired position at once and will not move out of that position whatever position the head may be moved to, or even if the head be severely shaken.

The above-described bearers may be applied to other forms of pince-nez glasses or spectacles with advantage as spring-retained hinged gripping devices.

As regards the particular constructions and dispositions of the parts of the devices herein set forth with reference to the example illustrated, these may be modified in different ways under the invention and springs of other kinds substituted for the one shown and combined with the frame in modified manners.

What I claim as this invention is—

1. A double eyeglass having the relative positions of the centers of the glasses constant or fixed and provided with a laterally-movable spring which carries a pivoted adjustable gripping-bearer, substantially as described.

2. In a double eyeglass or spectacles, the combination, with the glasses, of a bar $d$, by which the centers of said glasses are fixed, springs $b$, mounted and fixed at one end on the frame of the glasses or the glasses themselves and having the other end free to move laterally, and gripping-bearers $a$, mounted on the free ends of the springs, one of such bearers having pivotal or rocking action about its point of support, substantially as set forth.

In testimony whereof I hereunto affix my signature in presence of two witnesses.

JOHN JAMES WOOD.

Witnesses:
FREDERICK JOHN CHEESBROUGH,
ERNEST R. ROYSTON,
Both of 15 Water Street, Liverpool, England.